United States Patent [19]
Dym

[11] 3,999,012
[45] Dec. 21, 1976

[54] GRAPHIC ENTRY TABLET WITH IMPROVED ADDRESSING

[75] Inventor: Herbert Dym, Poughkeepsie, N.Y.

[73] Assignee: IBM Corporation, Armonk, N.Y.

[22] Filed: July 7, 1975

[21] Appl. No.: 593,895

[52] U.S. Cl. ............................ 178/18; 340/347 AD
[51] Int. Cl.² ......................................... G08C 21/00
[58] Field of Search .......... 178/18, 19, 20; 33/1 M, 33/23 J; 340/347 AD, 146.3 SY

[56] References Cited
UNITED STATES PATENTS

| | | | |
|---|---|---|---|
| 3,342,935 | 9/1967 | Leifer et al. | 178/19 |
| 3,828,128 | 8/1974 | Dethloff et al. | 178/18 |

OTHER PUBLICATIONS

Ivaschenko et al., "Inductive Transducers . . . ," [Soviet Journal of] *Instrumentation and Control*, No. 8, Aug. 1969, pp. 22–25.

*Primary Examiner*—Thomas A. Robinson
*Attorney, Agent, or Firm*—William S. Robertson

[57] ABSTRACT

An improved tablet system is disclosed of the type having an array of X dimension wires and Y dimension wires that are capacitively coupled to a pen that a user holds to the tablet to produce a position signal. The X and Y wires are individually coupled to drivers so that the wires on one side of the pen position can be activated and the wires on the other side can be not activated for a pen position sensing operation. To reduce the number of drivers required for a large tablet, the wires are arranged in groups with an individual driver capacitively coupled to a correspondingly positioned wire in each group. A new packaging arrangement is provided and a new system is provided for addressing the drivers to produce the selected activation pattern.

7 Claims, 4 Drawing Figures

GRAPHIC ENTRY TABLET WITH IMPROVED ADDRESSING

RELATED CASES

This specification describes an improvement in a tablet of the type described in application Ser. No. 583,350 of H. Dym and S. Kambic entitled "Tablet System With Digital Activation" filed June 2, 1975 which is incorporated by reference in this specification.

INTRODUCTION

A tablet of the type to which this invention applies has a set of closely spaced X dimension wires and a set of closely spaced Y dimension wires that are selectively given an alternating voltage or are maintained at a fixed potential in a pattern that corresponds to the position of the wire. A user of the tablet holds a pen to a selected position on the tablet and the signal from the wires is capacitively picked up by the pen and this signal is operated on to form the X and Y coordinates of the pen position. In one arrangement of the known prior art for giving each wire a unique voltage, the wire at the left (arbitrarily) edge of the tablet is held at ground potential and each wire to the right has a progressively higher amplitude alternating voltage. This voltage distribution is commonly provided by a voltage dividing resistor. In another known technique for providing this voltage distribution, which will be described in relation to the preferred embodiment of the invention, a conductive tab at the end of each drive wire forms one plate of a capacitor and the second plate extends over all of these tabs in a triangular shape that produces a different capacitive coupling for each wire. When the triangular plate is connected to an alternating voltage source a progressively different voltage appears on each wire. See pages 1342–1347 of the September 1973 issue of the *IBM Technical Disclosure Bulletin*.

The cited application of Dym and Kambic teaches a set of drivers that are each connected to an individual wire. A driver has two states and a driver either applies an alternating voltage of a uniform maximum amplitude to its associated wire or maintains the associated wire at ground potential. The two driver states are called "activated" and "not activated" and may also be designated 1 and 0 states. With this arrangement, the voltage gradient that signifies the pen position is restricted to a very small area where the 0 to 1 transition occurs in the activation pattern and high resolution can be achieved with less costly analog circuit components.

SUMMARY OF THE INVENTION

The tablet system of this invention has the discrete driver arrangment of Dym and Kambic but the number of drivers is reduced significantly. The wires for each dimension are divided into groups of equal numbers of wires. In the example of the preferred tablet, there are 24 wires in each group. For generality, this number can be disignated $n$. The wires in each group can be thought of as being numbered 0 through $n$-1 from left to right so that wires of a particular number have the corresponding position in each group. The corresponding wires in each group are driven together, and there are only $n$ drivers for the X dimension wires and $n$ drivers for the Y dimension wires. A group of $n$ drive lines extends along the edge of the X wires, and a similar set of $n$ drive lines extends along edge of the Y wires. (The terms "wires" and "lines" will be used to distinguish these conductors, but in physical construction they are similar.) Each of these drive lines is connected to an individual driver. For example, in the preferred embodiment there are 24 X drivers and 24 Y drivers.

Preferably, the wires are capacitively coupled to the drive lines. The Y dimension wires are supported on one surface of a layer of dielectric material and the X dimension wires are supported on the opposite surface of the dielectric layer. Capacitive coupling electrodes are located around the periphery of each surface for coupling the wires of one surface to drive lines that are carried on the other surface. For example, the X dimension wires each have capacitive tabs at their ends, and the X drive lines and associated capacitive tabs are formed on the Y dimension dielectric surface and extend over the capacitive tabs of the X dimension wires. To achieve this interconnection structure in a small marginal space, the tabs for the X and Y dimension wires are oriented along the length of the drive lines and at right angles to the wires. A system of printed conductors forms the conductive connection between the wires and the tabs.

In the operation of the tablet, a 0 to 1 transition is produced separately for the X dimension and for the Y dimension at the space where the pen is located. A pattern of activated wires is established for a suitable distance to one side (arbitrarily the right) of the pen and a pattern of unactivated wires is established for a suitable distance on the other side (the left) of the pen. The same activation pattern is applied to each group of wires and the 0 to 1 transition exists in a corresponding position in each group, regardless of which group the pen is actually located in. Between these 0 to 1 transitions there is of course a 1 to 0 transition. As the invention has been described so far, this 1 to 0 transition would be located between the last wire of one group and the first wire of the next group to the right. If this were the case, the activation region would extend for only a few wires to the right when the pen is located near the right boundary of a group and, conversely, the unactivated region would extend for only a few wires to the left when the pen is located near the left boundary of a group. This invention avoids this difficulty and at the same time simplifies the addressing circuits. The selection of the drivers is controlled by a set of bits that are called an "address". According to this invention, this address directly controls only a contiguous group of half of the drivers. The other half of the drivers are controlled according to the complement of this address. Thus, if a 0 to 1 transition takes place in the left half of a group, a 1 to 0 transition takes place in the right half and the distance between these transitions is half the span of a group. Thus a maximum separation occurs between the 0 to 1 transition and the 1 to 0 transition. The number of drivers in a group is selected to make this span suitably long but also to limit the number of drivers.

Other features of the invention will be recognized in the description of the tablet and addressing circuit of the drawing.

THE DRAWING

THE TABLET OF THE DRAWING

Introduction

Figure 1:
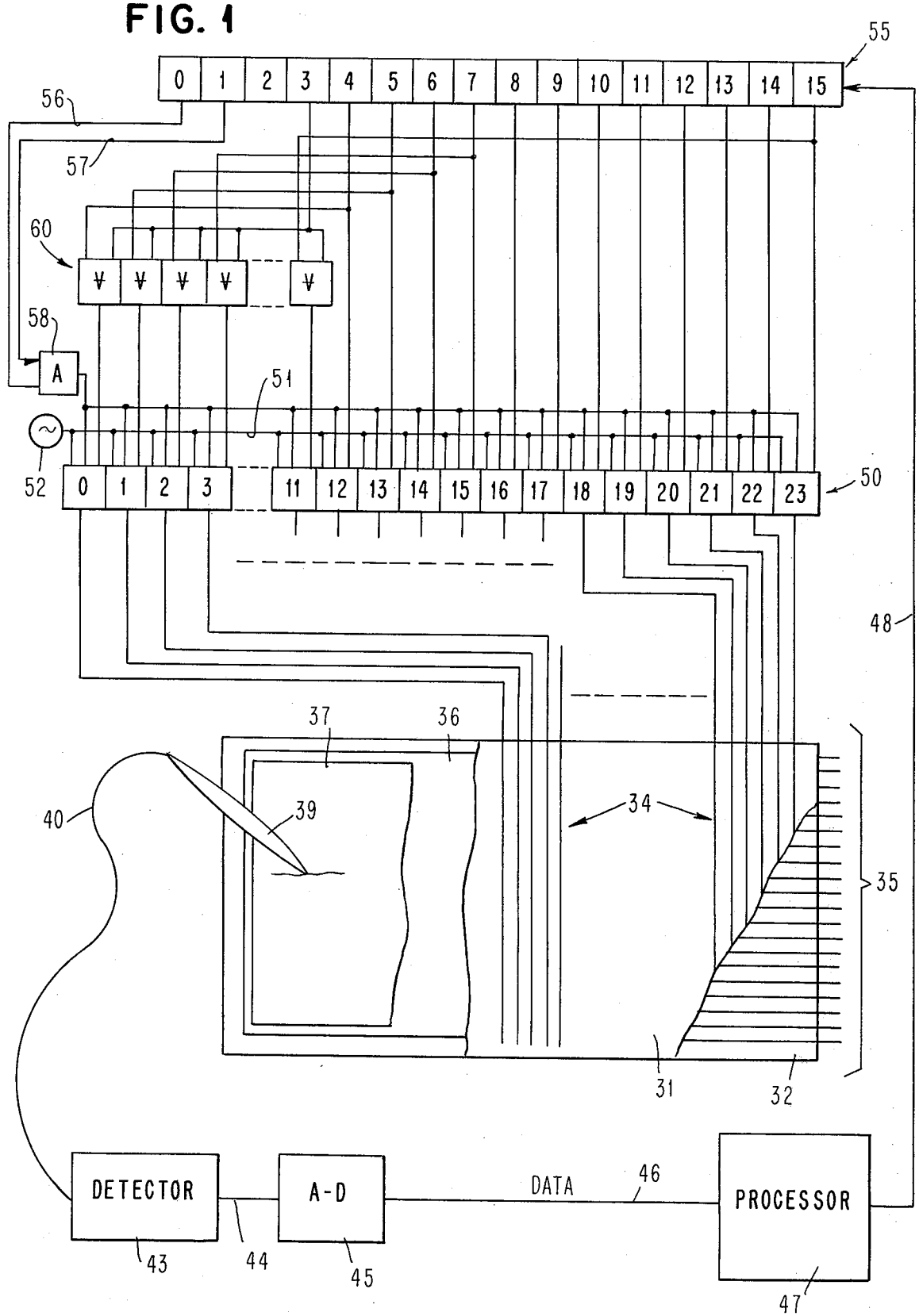
FIG. 1 shows the tablet and the associated addressing and control circuits.

It will be helpful to review the components of the tablet of FIG. 1 that are similar to the tablet of Dym and Kambic and to introduce the improvements of this invention that will be described in detail later. The tablet has dielectric layer 31 that carries a set of X dimension wires 34 on its upper surface and a set of Y dimension wires 35 on its lower surface. A lower dielectric layer 32 provides insulation for Y dimension wires 35. The X dimension wires are coupled to a set of drivers 50 that activate the X dimension wires with an alternating voltage, as will be described later. The Y dimension wires are coupled to a similar set of drivers that is not shown in the drawing.

The dielectric layers 31 and 32 are covered with a protective layer 36 of glass or other suitable material and a user of the tablet may put one or several layers of paper 37 over the glass. A user of the tablet holds a pen 39 at a selected position on the tablet. The preferred pen is described in the IBM *Technical Disclosure Bulletin*, November, 1974, page 1690. The pen receives the alternating voltage from the activated tablet wires of the X (or Y) dimension by capacitive coupling, and this signal appears on an output wire 40 of the pen. A detector 43 (a rectifier and filter) receives the pen signal and produces at its output 44 a direct voltage signal that varies according to the magnitude of the alternating voltage on wire 40. An analog to digital converter 45 converts this voltage to a corresponding digital signal that is transmitted on a bus 46 to a processor 47. The processor operates on the data on bus 46 to provide the address of the position of the pen on the tablet. The processor also provides control signals on a bus 48 for controlling the tablet system, as will be explained later. In addition, the processor may execute programs that are provided by the user of the tablet to operate on the position address that the tablet system provides. Thus processor 47 has several functions that can be assigned to independent processors.

Each driver of set 50 receives a signal on a line 51 from an oscillator 52. The waveform of the oscillator is rectangular to present an alternating sequence of 1 and 0 bits. A driver is controlled by the AND function of its inputs to produce the alternating voltage of oscillator 52 at its output. In the absence of a coincidence of these inputs, a driver maintains its output at a fixed potentail, preferably ground. The signal producing state of a driver is called "activation".

Means is also provided for applying the signal of oscillator 52 to the tablet wires in such a way that the signal amplitude varies progressively from one edge of the tablet to the opposite edge for locating the approximate position of the pen. This operation is conventional and the corresponding components of the tablet will be described only as they relate to digital features of this invention.

X and Y Dimension Wire Groups

The tablet wires 34 and 35 that are shown in FIG. 1 represent a group of 24 X dimension wires and a group of 24 Y dimension wires. The rectangular shape of the tablet represents an array of 48 by 24 wires made up of two groups in the X dimension. An array with four groups in each dimension will be described in relation to FIG. 2, and any suitable number of groups may be used. The groups of wires for a dimension are coupled to the drivers in parallel, as will be described later.

Driver Selection And Control

A register 55 holds a sixteen bit control word to control the selection of the X and Y drivers. Bit positions 0-3 of the control word are control bits and bit positions 4-15 hold an address. Address bit positions 4-15 are connected to control drivers 12-23, as the connections from the output of a stage of register 55 to the input of a driver show. For example, when bit position 10 of register 55 holds a 0, driver 18 is turned off and maintains its output at a fixed potential; when bit position 10 holds a 1, driver 18 can be turned on to activate wire number 18 in each group.

A set of Exclusive OR gates 60 couple the address bits in register position 4-15 to drivers 0-11. These gates are controlled by bit position 3 of register 55 to selectively invert the address bits. When register position 3 holds a 0, gates 60 transmit their inputs to the inputs of drivers 0-11. In this condition, drivers 0-11 have the same activation pattern as drivers 12-23. When register position 3 holds a 1, gates 60 invert the contents of register positions 4-15 and drivers 0-11 have the complement of the state of drivers 12-23. An example of this operation will be described later.

Bit position 0 and 1 supply signals on lines 56 and 57 to an AND gate 58 to enable drivers 50 when position 0 holds a 1 and position 1 holds a 0. (The half arrow on line 57 signifies an invert operation on the output of register position 1.) A similar gate (not shown) connects these register positions to control the Y dimension drivers. When position 0 holds a 0 all of the drivers are disabled; this condition permits an operation to produce a voltage gradient across one dimension of the tablet. When register position 0 holds a 1, either the X or the Y drivers are enabled to respond to the address held in bit positions 4-15 of register 55. A 0 in position 1 enables the X drivers 50 and a 1 enables the Y drivers.

Figure 2:
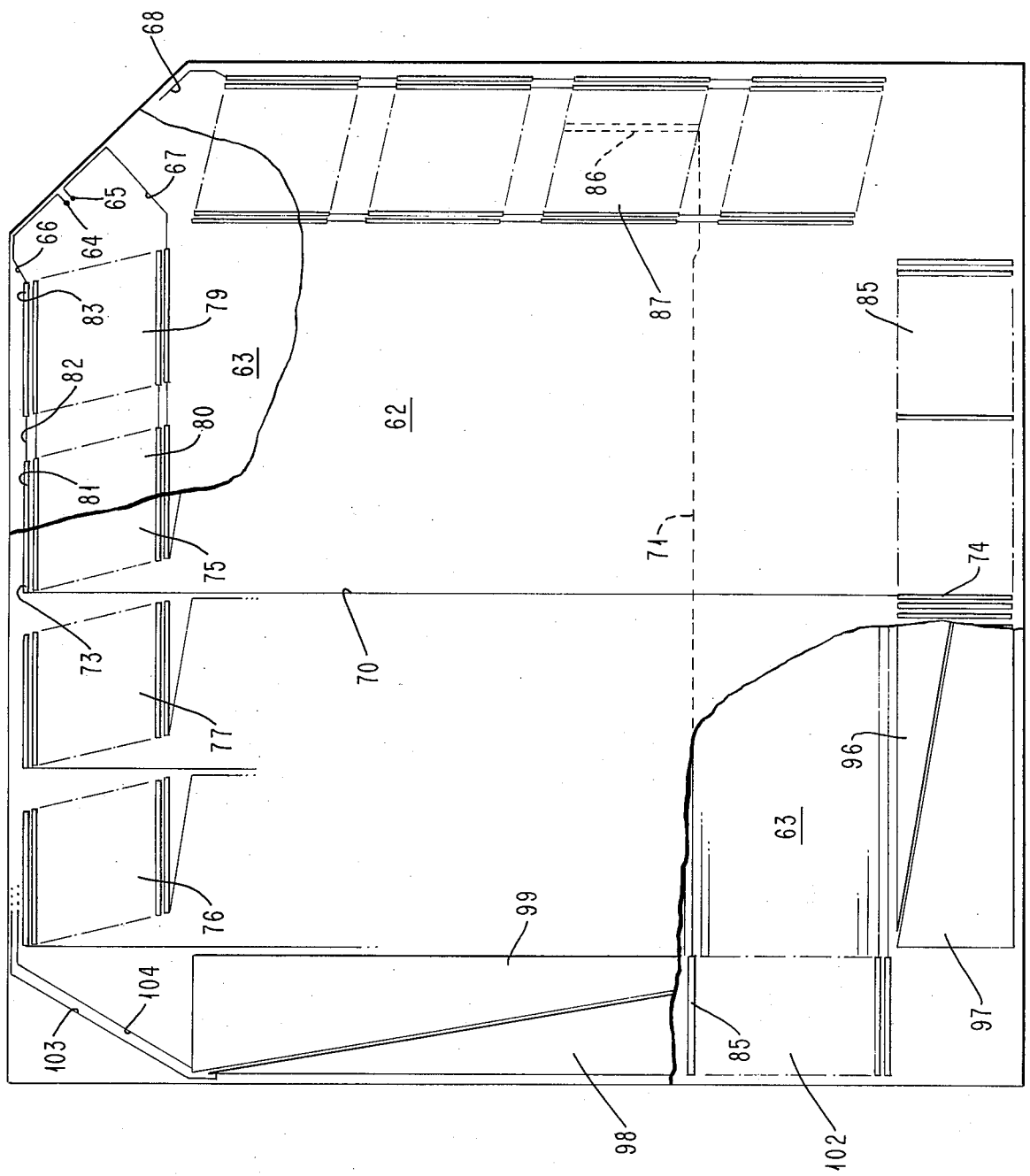
FIG. 2 shows the construction of the two dielectric layers and conductors of FIG. 1 with parts of the upper layer removed.

Tablet Construction — FIGS. 2=4

Figure 3:
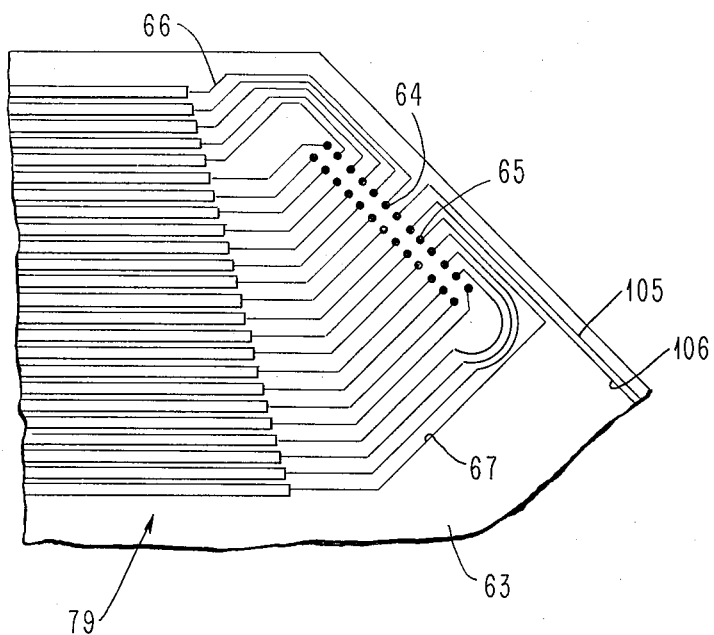
FIGS. 3 and 4 show enlarged details of the tablet construction of FIG. 2.

FIG. 2 shows the two surfaces 62 and 63 of dielectric layer 31 of the tablet of FIG. 1 with parts of upper surface 62 broken away to show parts of the conductors of the lower surface. (Equivalently, surfaces 62, 63 can be formed on separate dielectric layers.) The two patterns of conductors are similar and their construction and their relationship to each other can be understood readily from the partial showing of FIG. 2. Electrical connections are made at the upper right hand corner of the tablet. FIG. 2 shows representative terminals 64, 65 and associated conductors 66, 67 for lower surface 63 and a representative conductor 68 for surface 62. FIG. 3 shows an enlarged view of the connector region of the tablet with the orientation of the connectors of lower surface 63. A suitable connector with a matching pattern of terminals is attached to the tablet.

A representative X dimension wire 70 is shown on upper surface 62 and a representative Y dimension wire 71 is shown on lower surface 63. Wire 70 is connected at its uppermost end in the drawing to a capacitive tab 73 and it is connected at its lower end to a capacitive tab 74. There are no other conductive connections to wire 70 and tabs 73, 74. Tab 73 is one of 24 tabs that are arranged in an array 75 that is represented in part by dot-dashed lines. The tabs have significantly more width than other conductors such as 66, 70, and they extend parallel to the adjacent edge of the tablet. The array of tabs 75 is shaped to provide space on surface 62 for connections between each tab of the array and the corresponding wire of the group. The tablet of FIG. 2 has four arrays of these tabs: the array 75, arrays 76 and 77, and an array that is not shown but corresponds to an array of tabs 79 on lower surface 63 which will be described later. Connections to the uppermost and lower most tabs in array 76 and 77 show the outline of a pattern of conductors that is shown in an enlarged view in FIG. 4, which corresponds to the orientation of the tab arrays of the lower layer. (Some of these conductors have been omitted in FIG. 4.)

Tab array 75 on upper surface 62 overlies a closely similar tab array 80 on lower surface 63. Tab 73 cooperates with a tab 81 to form a capacitor. A conductor 82 connects tab 81 to a tab 83 in array 79 and the conductor 66 connects tab 83 to terminal 64. Terminal 64 is connected to driver 0 in FIG. 1. Thus, when driver 0 is enabled to produce the alternating voltage of oscillator 52 at its output, this voltage appears on tabs 81, 83 and two corresponding tabs that underly tab array 76 and 77. This voltage is capacitively coupled to tab 73 and the associated wire 70 and to the corresponding wires of arrays 76, 77, and the array that overlies array 79.

Similarly, Y dimension wire 71 is conductively connected to tabs 85 and 86 on lower surface 63, and tab 86 is capacitively coupled to a tab (not shown) in an array 87 on upper surface 62. The tabs of array 87 are conductively connected to terminals in a pattern that is the mirror image of the pattern of connectors and terminals for lower surface 63.

Figure 4:
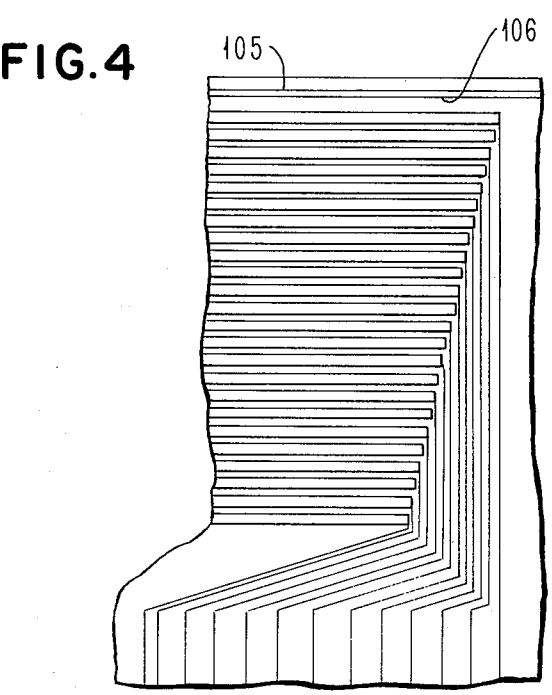

Other components in the structure of FIG. 2 energize the tablet wires of one dimension with an alternating voltage that varies progressively from one edge to the opposite edge. Tab 74 on upper surface 62 is one of a set of 96 tabs that form a rectangular array 85. Tab array 85 overlies two triangular plates 96, 97 that are formed on the lower surface 63. The capacitive coupling between a tab in array 85 and one of the capacitor plates 96, 97 is a function of the position of the tab in the array. This capacitance cooperates with the capacitive coupling to pen 39 to form a voltage divider so that pen 39 receives a voltage that depends on its position between the right and left edges of the tablet when one of the capacitor plates 96 and 97 its activated. Two other capacitor plates 98, 99 cooperate with an array of tabs 102 for a similar operation in the Y dimension. Conductors 103, 104 connect plates 98, 99 to terminals (not shown) in the upper right hand corner of the tablet. Corresponding conductors 105, 106 for plates 96, 97 or the lower layer are shown in FIGS. 3 and 4.

Operation

Suppose that an operation with the X dimension triangular plates 96, 97 has established that the pen position is between wires 20 and 21 of array 75. This information can be thought of as a binary address having two parts, a high order part that identifies array 75 and a lower order part that identifies wire 20. Processor 47 then loads register 55 with a control word to produce a 0 to 1 transition in the activation pattern at wires 20, 21 in each group. Bit positions 4-15 of the control word have the pattern 0000 0000 0111 and drivers 12-23 and the corresponding wires are activated in this pattern. (Bits are arranged in groups of four so that they can be read more easily.) The resulting activation pattern is equivalent to the corresponding step in the operation of the tablet of Dym and Kambic and the processor receives and stores the digital signal on bus 46.

The control word that is entered into register 55 for this step of the operation is formed from the number of the wire to the left of the pen position according to the following partial table. processor 47 stores such a table or otherwise provides the translation from the wire number to the appropriate control word.

| Wire | Activation Pattern | Control Word |
|---|---|---|
| 0 | 0111 1111 1111 1000 0000 0000 | 1001 1000 0000 0000 |
| 1 | 0011 1111 1111 1100 0000 0000 | 1001 1100 0000 0000 |
| 2 | 0001 1111 1111 1110 0000 0000 | 1001 1110 0000 0000 |
| 3 | 0000 1111 1111 1111 0000 0000 | 1011 1111 0000 0000 |
| 10 | 0000 0000 0001 1111 1111 1110 | 1001 1111 1111 1110 |
| 11 | 0000 0000 0000 1111 1111 1111 | 1001 1111 1111 1111 |
| 12 | 1000 0000 0000 0111 1111 1111 | 1001 0111 1111 1111 |
| 13 | 1100 0000 0000 0011 1111 1111 | 1001 0011 1111 1111 |

The symbol $\phi$ signifies that bit position 2 of the control word may be either a 1 or a 0. The 1 in bit position 0 and the 0 in bit position 1 control the tablet for an operation with the X dimension drivers, as has already been explained. The 1 in bit position 3 causes drivers 0-11 to have the complement of the state of drivers 12-23.

The 0 to 1 transition in the activation pattern can be seen to move to the right as the wire number increases. The 1 to 0 transition also moves to the right so that it is always twelve positions to the right or left of the 0 to 1 transition. A 1 to 0 transition also exists in one of the two adjacent groups twelve positions away from the 0 to 1 transition that is represented in the table. Thus, the activation pattern is uniform for a suitable number of wires on either side of the pen position and it is independent of the position of the pen within a group.

When this step of the operation has been completed, processor 47 loads register 55 with a control word to activate the wires on each side of the pen position for the reference measuring operation described in the application of Dym and Kambic. The control word 10$\phi$0 1111 1111 1111 is suitable for this operation. Notice that the 0 in register position 3 causes drivers 0-11 to be activated in response to the 1 bits in register positions 4-15.

When this step of the operation has been completed, a corresponding operation is begun on the Y dimension drivers by loading register 55 with a suitable control word that has a 1 in bit position 1.

The operation that has been described can be modified to control the drivers for an operation to identify the wire to right (or left) of the pen position. The triangular plates are used to identify the approximate wire with sufficient precision that the group address is not ambiguous. For example, the pen position might be identified as between wire 16 of one group and wire 5 of the next group to the right. Register 55 is loaded with a control word (from the table) to produce a 0 to 1 transition between wires 16 and 17 of each group and the signal on bus 46 is stored. The control word is then incremented to produce a 0 to 1 transition between wires 17 and 18 and a second value is stored. This operation is continued until the pen position is identified. The pen location is identified by a value on bus 46 that falls within the range of values for the location of the pen in the transition region.

Other Embodiments

The shift register addressing arrangement of Dym and Kambic can be used for addressing all of the drivers with a 1-0 transition occurring between groups or with the 1-0 transitions spaced equally between the 0-1 transitions. The capacitive coupling to the drivers is advantageous in permitting the corresponding wires of each group to have differing voltages for the operation of the triangular capacitor plates, but various other coupling techniques can be used for coupling a driver to the corresponding tablet wires, and a variety of known techniques can be substituted for the triangular capacitor plates for identifying the group of wires of the pen position. From the description of the preferred embodiment of the invention and these references to known tablets and the related technology, those skilled in the art will recognize appropriate modifications within the spirit of the invention and the scope of the claims.

What is claimed is:

1. A tablet of the type having a plurality of X dimension wires and a plurality of Y dimension wires arranged to be electrically coupled to a pen, means including a plurality of X dimension and Y dimension drivers for producing an electrical signal on the wires to be recieved by the pen for producing a pen position address, and means for controlling the drivers of a selected dimension to produce a selected activation pattern having a 0 to 1 transition at the pen position, wherein the improvement comprises, means coupling each driver for the X dimension and each driver for the Y dimension to a plurality of wires of the corresponding dimension in a repeating pattern in which 0 to 1 transitions in the activation pattern occur at a plurality of positions, means for controlling said drivers to produce 1 to 0 transitions in the activation pattern midway between said 0 to 1 transitions, and means for identifying the address of the 0 to 1 transition of the pen position.

2. The tablet of claim 1 wherein said means coupling said drivers to said wires comprises means coupling said drivers and wires in a pattern in which said 0 to 1 transitions occur at intervals of wires equal to the number of drivers of the corresponding dimension.

3. The tablet of claim 2 having a selected number of said X drivers and said selected number of said Y drivers, said number being designated $n$, and wherein each driver and the wires it is coupled to are identified by an individual number in the sequence 0 through $n-1$, and wherein said wires are arranged in the sequence 0 through $n-1$ each of a plurality of groups of $n$ of said wires.

4. The tablet of claim 3 wherein said means for controlling said drivers includes a register having $n/2$ positions, means connecting the drivers identified in the sequence $n/2$ through $n-1$ to be controlled according to the content of an individual bit position of said register and connecting the other of said drivers to be selectively controlled according to the content of an individual position of said register or to the complement of the content of said position.

5. The tablet of claim 4 wherein said means coupling said drivers to the associated wires comprises a plurality of capacitors.

6. The tablet of claim 5 including dielectric layer means supporting said X dimension wires on a first surface and said Y dimension wires on a second surface and wherein said means coupling said drivers to said wires comprises pairs of capacitive tabs located on opposite of said surfaces, one tab of each pair being connected to an associated wire and the other tab of each pair being connected to the associated driver.

7. The tablet of claim 5 wherein said means for identifying the address of the 0–1 transition of the pen position comprises, a plurality of capacitive tabs for each wire and a triangular capacitor plate for each dimension coupled to the tabs of the wires of the corresponding dimension and adapted to receive said electrical signal.

* * * * *